(12) United States Patent
Gavriil et al.

(10) Patent No.: US 11,170,030 B2
(45) Date of Patent: Nov. 9, 2021

(54) SELECTING PROPERTIES USING LOCATION CONSTRAINTS BASED ON TRAVEL TIME CONTOURS

(71) Applicant: Fannie Mae, Washington, DC (US)

(72) Inventors: Fotis Gavriil, Vienna, VA (US); Steven Pierce, Annandale, VA (US); Eric Rosenblatt, Derwood, MD (US); John Treadwell, Washington, DC (US); Jesse Staal, Washington, DC (US)

(73) Assignee: Fannie Mae, Washington, DC (US)

( * ) Notice: Subject to any disclaimer, the term of this patent is extended or adjusted under 35 U.S.C. 154(b) by 547 days.

(21) Appl. No.: 14/790,424

(22) Filed: Jul. 2, 2015

(65) Prior Publication Data

US 2017/0004146 A1   Jan. 5, 2017

(51) Int. Cl.
*G06F 16/29*   (2019.01)
*G06Q 50/16*   (2012.01)

(52) U.S. Cl.
CPC ............. *G06F 16/29* (2019.01); *G06Q 50/16* (2013.01)

(58) Field of Classification Search
None
See application file for complete search history.

(56) References Cited

U.S. PATENT DOCUMENTS 7,940,741 B2 *  5/2011  Lee .................... G08G 1/092
                                                        370/349
8,566,030 B1 * 10/2013  Demiryurek ....... G01C 21/3492
                                                        701/409
2002/0091556 A1 *  7/2002  Fiala .................... G06Q 10/02
                                                        705/6
2004/0068443 A1 *  4/2004  Hopson ................ G06Q 10/02
                                                        705/5
2004/0139049 A1 *  7/2004  Hancock ................ G01C 21/20
2005/0149561 A1 *  7/2005  Hodnett ............ G06F 17/30241
2005/0278062 A1 * 12/2005  Janert .................. G06Q 10/08
                                                        700/214
2006/0122767 A1 *  6/2006  Athalye ................ G01C 21/00
                                                        701/532
2007/0130026 A1 *  6/2007  O'Pray ................ G06Q 30/02
                                                        705/14.69

(Continued)

OTHER PUBLICATIONS

Corelogic, "INRIX Drive Time," available at http://www.corelogic.com/downloadable-docs/1-inrixdt-1013-00-inrix-drive-time-by-corelogic-screen.pdf (2013) (Year: 2013).*

(Continued)

*Primary Examiner* — Jan P Mincarelli
(74) *Attorney, Agent, or Firm* — Michael Best and Friedrich LLP (57) ABSTRACT

A database of property data is searched based on a location constraint that is determined based on travel time contours constructed for multiple locations of interest. The locations of interest and travel parameters associated therewith are selected by a user. The travel parameters include a maximum travel time for each location. For each location, the travel time contour is constructed based on the travel parameters for the location such that points within the travel time contour have a travel time to the location that is less than or equal to the maximum travel time. The travel time contours are intersected, and the location constraint is based on the intersection.

18 Claims, 7 Drawing Sheets

(56) References Cited

U.S. PATENT DOCUMENTS

| | | | |
|---|---|---|---|
| 2007/0150375 A1* | 6/2007 | Yang | G06Q 10/08 |
| | | | 705/339 |
| 2007/0216521 A1* | 9/2007 | Guensler | G08G 1/0104 |
| | | | 340/439 |
| 2007/0220123 A1* | 9/2007 | Agrawal | G06F 17/30241 |
| | | | 709/223 |
| 2007/0293958 A1* | 12/2007 | Stehle | G06Q 10/04 |
| | | | 700/30 |
| 2008/0059889 A1* | 3/2008 | Parker | G06F 17/30241 |
| | | | 715/748 |
| 2008/0208451 A1* | 8/2008 | Minami | G01C 21/32 |
| | | | 701/533 |
| 2009/0005968 A1* | 1/2009 | Vengroff | G06F 17/3087 |
| | | | 701/425 |
| 2009/0012955 A1* | 1/2009 | Chu | G01C 21/3679 |
| 2009/0048938 A1* | 2/2009 | Dupray | G06Q 30/02 |
| | | | 705/27.1 |
| 2009/0125556 A1* | 5/2009 | Naroian | G06F 17/30781 |
| 2009/0138445 A1* | 5/2009 | White | G06Q 30/02 |
| 2010/0017118 A1* | 1/2010 | Dougherty | G01C 21/3423 |
| | | | 701/533 |
| 2010/0094548 A1* | 4/2010 | Tadman | G01C 21/36 |
| | | | 701/533 |
| 2011/0130950 A1* | 6/2011 | Wexler | G01C 21/3492 |
| | | | 701/532 |
| 2012/0077521 A1* | 3/2012 | Boldyrev | H04W 4/043 |
| | | | 455/456.3 |
| 2012/0136572 A1* | 5/2012 | Norton | G01C 21/3407 |
| | | | 701/465 |
| 2012/0143886 A1* | 6/2012 | Okude | G01C 21/32 |
| | | | 707/756 |
| 2012/0284202 A1* | 11/2012 | Dalby | G06Q 30/02 |
| | | | 705/313 |
| 2013/0046795 A1* | 2/2013 | Borgerson | G06Q 10/06 |
| | | | 707/798 |
| 2013/0267253 A1* | 10/2013 | Case | H04W 4/021 |
| | | | 455/456.3 |
| 2013/0297175 A1* | 11/2013 | Davidson | G07B 15/06 |
| | | | 701/99 |
| 2014/0129124 A1* | 5/2014 | Margulici | G08G 1/0112 |
| | | | 701/117 |
| 2014/0149157 A1* | 5/2014 | Shaam | G06Q 50/14 |
| | | | 705/6 |
| 2014/0156189 A1* | 6/2014 | Hart | G01C 21/3484 |
| | | | 701/538 |
| 2015/0120176 A1* | 4/2015 | Curtis | G06Q 10/06 |
| | | | 701/119 |
| 2016/0070712 A1* | 3/2016 | Prabhakar | G06F 17/3087 |
| | | | 707/766 |
| 2016/0091331 A1* | 3/2016 | Schilling | G01C 21/32 |
| | | | 701/533 |
| 2016/0148121 A1* | 5/2016 | Durham | G06Q 10/02 |
| | | | 705/2 |
| 2016/0321764 A1* | 11/2016 | Cardoso | G06Q 50/14 |

OTHER PUBLICATIONS fastcodesign.com, "Trulia's New Maps Show Your Commute Time From Your New House," Jun. 25, 2012, available at https://www.fastcodesign.com/1670124/trulias-new-maps-show-your-commute-time-from-your-new-house (accessed Jan. 17, 2018). (Year: 2012).*

Har.com, "Har.com Introduces 'Inrix Drive Time' Tool to Enhance Consumer Real Estate Search Experience," press release, Jan. 25, 2015, available at http://inrix.com/press-releases/har-com-introduces-inrix-drive-time-tool-enhance-consumer-real-estate-search-experience/ (accessed Jan. 17, 2018). (Year: 2015).*

Levinson, David, "Elements of Access," available at https://transportest.org/books/element-of-access/ (accessed Jan. 16, 2018). (Year: 2017).*

Rossi, Shelly, "Commute Getting You Down? Try 'Search by Drive Time' on Windermere.com," Aug. 12, 2013, available at https://www.windermere.com/blogs/windermere/posts/commute-getting-you-down-try-search-by-drive-time-on-windermere-com (accessed Jan. 17, 2018). (Year: 2013).*

Wikipedia, "Isochrone map," available at https://en.wikipedia.org/wiki/Isochrone_map (accessed Jan. 16, 2018). (Year: 2018).*

Zillow Questions, "Commute Times," Sep. 14, 2013, available at https://www.zillow.com/advice-thread/Commute-Times/511330/ (accessed Jan. 17, 2018). (Year: 2013).*

Corelogic, "Drive Time Data Sheet," 2013, available at https://web.archive.org/web/20140820090021/https://www.corelogic.com/downloadable-docs/1-inrixdt-1013-00-inrix-drive-time-by-corelogic-screen.pdf (accessed Jun. 11, 2018).*

Corelogic, "Inrix Drive Time by CoreLogic," News, archived Aug. 20, 2014. Available at https://web.archive.org/web/20140820090021/https://www.corelogic.com/products/inrix-drive-time-by-corelogic.aspx (accessed Jun. 11, 2018).*

Corelogic, "Inrix Drive Time Take the Guesswork Out of Purchasing a New Home," Mar. 12, 2013. Available at http://inrix.com/blog/2013/03/inrix-drive-time/ (accessed Jun. 11, 2018).*

Corelogic, "RE/MAX and INRIX Team to Help You Find the Perfect Home," Jan. 13, 2014. Available at http://inrix.com/blog/2014/01/remax-and-inrix-team-to-help-you-find-the-perfect-home/ (accessed Jun. 11, 2018).*

Florida Department of Transportation, "Probe Data Analysis: Evaluation of NAVTEQ, TrafficCast, and INRIX Travel Time System Data in the Tallahassee Region," Mar. 27, 2012. Available at http://www.fdot.gov/traffic/ITS/Projects_Deploy/2012-03-26_Probe_Data_Analysis_v2-0.pdf (accessed Jun. 11,.*

Jacobi, OB, "Search (a lot) Smarter with Windermere's New INRIX Drive Time Tool," Mar. 12, 2013. Available at https://www.windermere.com/blogs/windermere/posts/search-a-lot-smarter-with-windermeres-new-inrix-drive-time-tool (accessed Jun. 11, 2018).*

Lightfoot, Chris, "Travel-time Maps and their Uses," mySociety.org, Mar. 4, 2006. Available at https://www.mysociety.org/2006/03/04/travel-time-maps-and-their-uses/ (accessed Jun. 11, 2018).*

Mid-America Regional Council Transportation Department, "Travel Time Study," 2013, available at http://marc.org/Transportation/Plans-Studies/Transportation-Plans-and-Studies/Special-studies-and-projects/special-studies-pdfs/Travel-Time-Study_Draft_01.aspx (accessed Jun. 11, 2018).*

Rossi, Shelly, "Commute getting you down? Try "Search by Drive Time" on Windermere.com," Windermere blog, Aug. 12, 2013. Available at https://www.windermere.com/blogs/windermere/posts/commute-getting-you-down-try-search-by-drive-time-on-windermere-com (accessed Jun. 11, 2018).*

Street, Nicholas, "TimeContours: Using isochrone visualisation to describe transport network travel cost," Jun. 14, 2006. Available at http://www.imperial.ac.uk/pls/portallive/docs/1/18619712.PDF (accessed Jun. 11, 2018).*

* cited by examiner

SELECTING PROPERTIES USING LOCATION CONSTRAINTS BASED ON TRAVEL TIME CONTOURS

BACKGROUND

1. Field of the Invention

The present invention relates generally to searching for properties, and more particularly to searching for properties using locations constraints that are based on travel times and other regions of interest.

2. Description of the Related Art

Various computer applications exist that estimate a travel time between two points. For example, a user may specify two points in a map and a mode of travel (e.g., walking, car, public transit, etc.), and based on this information and on other facts known to the application (e.g., distances, speed limits, traffic patterns, etc.), the application can calculate an estimated travel time between the two specified points.

There also exist various computer applications that allow a user to search for properties that are for sale. For example, a user may specify search criteria, such as a price range, desired attributes (e.g., number of bedrooms), etc., and the computer application may search a database of property data based on the user-selected criteria.

SUMMARY

When looking for a new home, one of the primary concerns of a potential home buyer is the length of the commute(s) that the potential home buyer would have if they bought the property. However, property searching applications that search listings of properties offered for sale do not determine travel times associated with the listed properties. In particular, the property searching applications do not determine travel times between any of the listed properties and any user-selected points of interest (such as the user's place(s) of employment), much less allow a user to search properties offered for sale based on such travel times. Thus, when a user searches for properties using existing property searching applications, they are confronted with search-results in which some of the properties are suitable to the user (from a travel time perspective) but many others are not suitable to the user (from a travel time perspective), and the user cannot know which of the properties are suitable without further investigation.

As a result, the user must go through the list of properties manually, one property at a time, to determine whether each individual property is suitable from a travel time perspective. This may involve calculating travel times separately for each property in the list (for example by using a third-party travel time application), which is a serious burden on the user. Furthermore, even if travel time information were automatically provided for each property in the search result list, the user would still have to consider each of the properties in the list separately to evaluate the travel time information for the property in order to determine whether the property was suitable. Thus, although automatic provision of travel time information may slightly lessen the burden on the user (since they no longer would have to calculate the travel times), it would not eliminate the burden because the user would still have to spend time and effort in evaluating each property in the search results from a travel time perspective.

Moreover, potential home buyers often have more than one location whose associated travel time they are concerned with. For example, more than one person in the household may commute to work (often to different locations). Moreover, the travel time to locations other than work is often important as well, such as the children's school, grandparent's house, gym, etc. It is often important to the potential home buyer that the respective travel times between all of these locations and the new home be within acceptable limits. Thus, the process discussed above of manually checking travel times of each property in a search results list becomes even more complicated and time consuming for the user when travel times for multiple locations per property have to be considered.

In addition, travel times are not the only location constraints that home-buyers are interested in. There may be certain regions that the buyers want to stay within (e.g., a desired school district) or certain regions that the buyers want to avoid (e.g., areas near a waste disposal facility). Existing property search applications do not have a location search constraint that takes into account these additional regions of interest, much less one that integrates the travel time considerations discussed above with such regions of interest.

Thus, the present disclosure provides systems, methods, and computer programs that allow for searching property data based on a location constraint that is determined at least in part from travel time considerations. The location constraint may be determined based on user selections of one or more locations of interest and corresponding travel parameters, including at least a maximum travel time for each of the locations. The user may also select additional travel parameters used in determining the location constraint, such as a mode of travel and a time of travel. These travel parameters may be used to determine a travel time contour for each location, and the location constraint may be based on the intersection of these travel time contours. The location constraint may be determined based further on user selected regions of interest (e.g., exclusive and inclusive regions).

For example, according to one aspect of an illustrative embodiment of the present disclosure, a computer program may be configured to cause various operations to be performed. The operations may include determining a first location of interest and a second location of interest. The operations may further include determining travel parameters for the first and second locations of interest, including a first maximum travel time for the first location of interest and a second maximum travel time for the second location of interest. The operations may further include determining a first travel time contour for the first location of interest based on the travel parameters for the first location of interest, and determining a second travel time contour for the second location of interest based on the travel parameters for the second location of interest. The operations may further include determining a location constraint based on an intersection of the first travel time contour and the second travel time contour. The operations may further include searching a database of property data based on the location constraint.

The present invention can be embodied in various forms, including computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

The present disclosure is related to optimizing property searches such that search results returned to the user are more narrowly tailored to meet the user's desired criteria, especially with regard to travel time criteria. Based on user-selected locations and corresponding maximum travel times (and perhaps on further user-selected travel parameters, as discussed further below), a location constraint may be determined, and a database of property data may be searched based on this location constraint. The location constraint may be a geographic region, and the search based on this constraint may return only those properties that are located in the geographic region (the search may further be constrained based on other specified search criteria, such as price, etc.).

The location constraint may be determined by constructing a travel-time contour for each location of interest selected by the user. Each travel-time contour forms a closed shape, such as, for example, a polygon, which corresponds to a geographic region. The location constraint may be set as the geographic region that corresponds to the intersection of the travel time contours. The location constraint may be additionally based on other criteria, such as inclusive and exclusive regions specified by a user.

Contour, in this context, refers to a curve along which a two-dimensional function has an approximately constant value. For a travel-time contour, the relevant function is a mapping of location coordinates to travel times. Thus, each travel-time contour is a curve along which the travel time to/from the corresponding location of interest is approximately constant. In particular, the value of the travel time along the travel-time contour may be approximately equal to the maximum travel time specified for the location of interest. Thus, the travel time from any point inside the contour to the specified location of interest may be (approximately) less than the maximum travel time, and the travel time from any point outside the contour to the specified location may be (approximately) greater than the maximum travel time.

Figure 1:
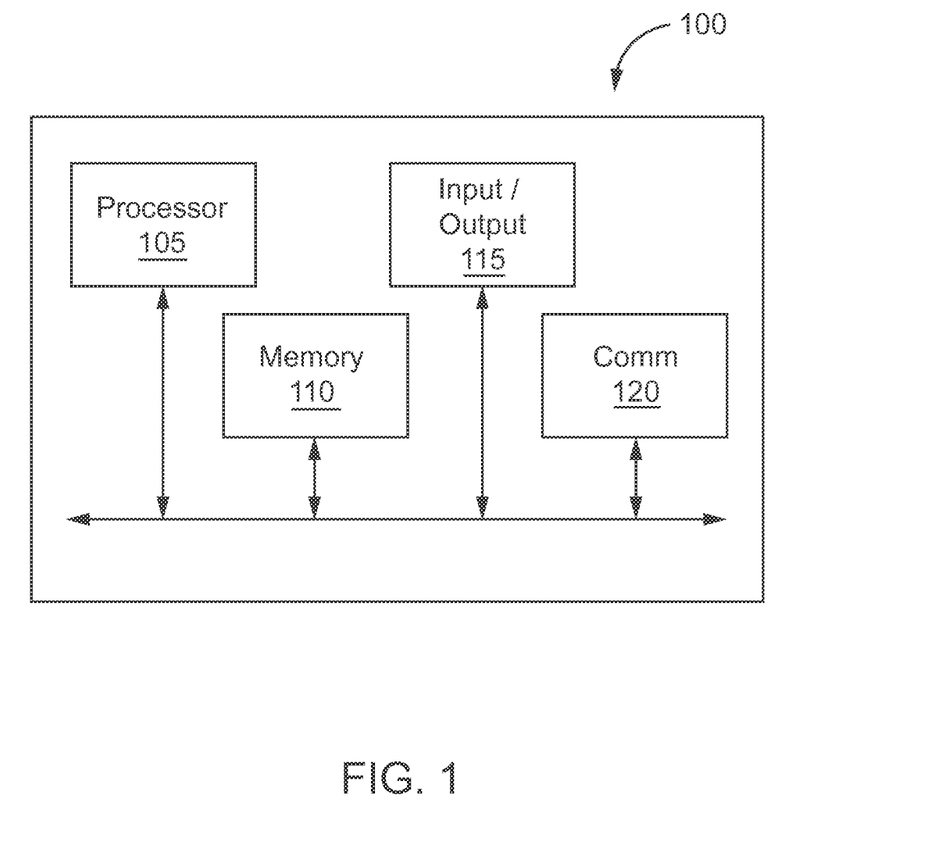
FIG. 1 is a conceptual diagram illustrating a computing system 100.

The determination of the location constraint and/or searching of the database based on the location constraint may be performed by an appropriately configured computing system, such as the computing system 100 illustrated in FIG. 1. A processor 105 may execute program code that is stored in a memory unit 110 (e.g., a non-transitory computer readable medium), and, when executed, the program code may cause the computing system 100 to perform the various operations described in this disclosure. In this fashion, the computing system 100 is configured to carry out a specific application for selecting properties using location constraints. The computing system 100 is also rendered more efficient for selecting properties by using the detailed algorithms described herein.

The computing system may include various additional components as is familiar in the art. For example, the system 100 illustrated in FIG. 1 includes an input/output unit 115, which may include various components for inputting and/or outputting information from/to a user (e.g., keyboard, display device, printer, voice recognition hardware and software, etc.), and a communications unit 120, which may include various components for communicating with external devices (e.g., Ethernet port, wireless adaptor, modem, etc.). The illustrated system 110 is merely exemplary, and it will be understood that various illustrated components could be omitted or other components not illustrated could be added, and that various alternative configurations of these components could be adopted.

Figure 2:
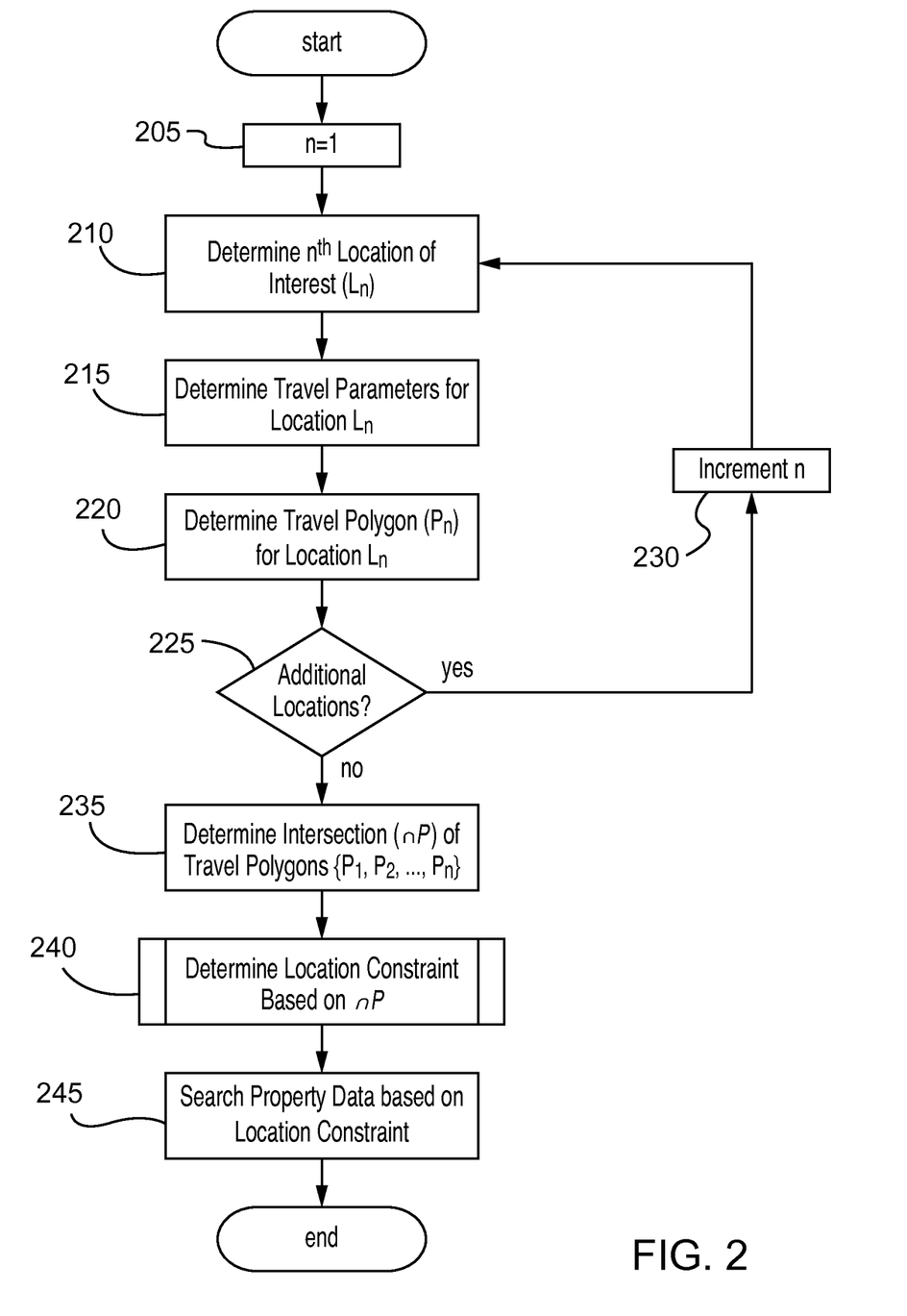
FIG. 2 is a process flow diagram illustrating a process for searching a database based on a location constraint.

FIG. 2 illustrates an exemplary process by which a property search application may search for properties based on travel time constraints. In the process, travel time polygons $P_n$ are used as examples of the travel time contours discussed above, but it will be understood that other types of travel time contours may be used.

The process begins, and in block 205, an index "n" is initialized to the value one. The index "n" is used herein as a label to keep track of user-selected locations of interest ("$L_n$"), as well as various things that correspond to the respective locations (e.g., travel time polygons ("$P_n$")). Thus, for example, the travel time polygon $P_3$ corresponds to the location $L_3$, since they share the same value of the index n (i.e., n=3). The index n is merely used in this discussion for convenience, and no special significance is necessarily attached to the value of n for any location $L_n$.

Subsequently, a loop comprising blocks 210 through 230 begins, in which a travel polygon $P_n$ is determined for each location of interest $L_n$. The loop is repeated for each location of interest $L_n$ selected by the user, starting with location $L_1$ and incrementing n with each pass of the loop until all locations of interest have been considered. In the figure, the travel times polygons $P_n$ are shown as being calculated serially (one-at-a-time in order) merely for convenience in explanation, but it will be understood that they could be calculated in parallel and also in any order.

Specifically, in block 210, the property search application determines the $n^{th}$ location of interest $L_n$. The $n^{th}$ location of interest $L_n$ may be determined based on user input. For example, a user may select a location in a displayed map image, enter coordinates of a location in a data entry field (or speak the coordinates if the application supports voice-recognition), enter information into a data entry field that is descriptive of the location (e.g., "Dupont Circle", "Time Square", "the Chrysler Building") (or speak the information if the application supports voice-recognition), or use any other form of input that would identify a location. The property search application may determine coordinates for the location $L_n$ based on the user input, such as longitude and latitude coordinates. Of course, it will be understood that any type of location coordinates that are capable of identifying the location may be used.

In block 215 travel parameters are determined for the location $L_n$. The travel parameters include at least a maximum desired travel time $t_n$ for the location $L_n$. Preferably, a user selects the maximum travel time $t_n$ for the location $L_n$, but it is also possible for a default value to be used. It is also preferable that the user be able to select a different travel time $t_n$ for each individual location $L_n$ (i.e., $t_1$ does not necessarily have to be the same as $t_2$). The travel parameters may further include any other parameters useful for estimating travel time, such as mode of travel (e.g., walking, bike, car, public transit, etc.), a specific day or days of week the travel will be undertaken (e.g., Wednesdays, weekdays, weekends, etc.), a specific time of day that the travel will be undertaken (e.g., 3:00 PM), a general time of day for the travel (e.g., rush hour, night, etc.), whether toll roads are permitted or excluded, a maximum amount of money for tolls per trip, and so on. Any parameter that could affect the selection of an appropriate travel route, the speed of travel along the travel route, or the traffic conditions along the travel route could be included as a travel parameter. These additional travel parameters may also be entered by the user, and/or may have a default setting.

In block 220 a travel time polygon $P_n$ is determined for the location $L_n$ based on the location coordinates of the location $L_n$, the travel parameters for the location $L_n$ (including at least the maximum travel time $t_n$), and on geographic/traffic data. The travel time polygon $P_n$ is a specific example of the travel-time contours discussed above. The travel time polygon $P_n$ corresponds to a region encompassing all the locations that are approximately travel time $t_n$ or less away from $L_n$. In other words, the boundary of the travel time polygon $P_n$ is approximately travel time $t_n$ from location $L_n$, with points inside the boundary being less than $t_n$ from $L_n$ and points outside the boundary being more than $t_n$ from $L_n$.

Any method of determining the boundary of the travel time polygon $P_n$ may be used. One exemplary process for determining $P_n$ is based on tracing paths to/from $L_n$ in various directions to points on the paths that are travel time $t_n$ away from $L_n$, and setting these points as boundary points of the polygon $P_n$. Another exemplary process for determining $P_n$ is based on calculating travel times from $L_n$ for a finite set of points around $L_n$, and determining which of those finite set are boundary points of the polygon $P_n$.

An example of determining $P_n$ based on tracing paths to/from $L_n$ follows. A collection of paths to/from $L_n$ may be traced, for example along established roads (for automobile travel), along public transit routes (for public transit travel), and so on. For each such path, the point along that path that is travel time $t_n$ from $L_n$ may be set as a boundary point $\beta$. Any convenient method may be used to determine the point along a given path that is travel time $t_n$ from $L_n$. For example, a distance d may be calculated that would correspond to the maximum travel time $t_n$ along that path, and the point that is distance d from $L_n$ along that path may be set as a boundary point. The distance d that corresponds to the maximum travel time $t_n$ along a given path may be determined based on an average speed s along that path and the formula $d=t_n \cdot s$. The average speed s may be determined, for example, based on speed limits along the path. For example, if a road to/from $L_n$ has a constant speed limit of 35 MPH, and the maximum travel time $t_n$ is 30 minutes, then the point on the road that is 17.5 miles from $L_n$ could be set as the boundary point $\beta$. Other information may be used in addition to (or instead of) the speed limits along the roads to determine the average speed s, such as a number of traffic lights along the path, traffic information, and so on. In particular, data indicating actual travel speeds of travelers going along path segments may be gathered, and the average speed s of a path may be determined from this data (for example, by averaging the path-segment travel speeds of the segments along the path). Additional considerations may be included to increase accuracy, such as the time of day, the day of the week, the direction of travel, the direction in which the driver exited the path segment (e.g., did they continue straight at the end of the path segment or did they turn), etc. Once the boundary points $\beta$ are determined for each path, each boundary point $\beta$ may be connected to its neighboring boundary points $\beta$ to form the polygon $P_n$. In one embodiment, the boundary points $\beta$ surround the location $L_n$ in many directions—that is, the paths that are traced are selected so as to extend to/from $L_n$ in many directions around $L_n$. In particular, in one exemplary process, every possible path outward from $L_n$ may be traced, which results in highly accurate determination of the boundaries of $P_n$. For example, if paths are restricted to established roads, then intersections of roads can be designated as nodes and road segments between nodes could be designated as edges, and a depth first search or a breadth first search of these nodes/edges could be done to determine each possible path connecting to $L_n$ out to a travel time $t_n$. In other exemplary processes, only a subset of the possible paths to/from $L_n$ are traced, which results in more efficient determination of the boundaries of $P_n$. When only a subset of paths are traced, rules may be applied to narrow down which paths to trace, such as rules that favor highways or roads designated as main arteries, and so on.

An example of determining $P_n$ based on determining travel times for a finite set of points follows. A grid of points $p_i$ may be established over a given region, which does not necessarily have to be regular or rectilinear-any form of tessellation may be used. For example, the points of the grid may be located only along established roads when the travel mode is by automobile. Travel times ($\tau_{n,i}$) may be calculated between at least some of the points $p_i$ in the grid and the location $L_n$. The boundary of $P_n$ may be determined based on these calculated travel times $\tau_{n,i}$—in particular, a collection of points $p_i$ in the grid whose respective travel times $\tau_{n,i}$ are approximately equal to $t_n$ may be set as boundary points $\beta$ of $P_n$, and the boundary of $P_n$ may be constructed by connecting these boundary points $\beta$ to their neighbors. Any method may be used to calculate the travel times $\tau_{n,i}$. For example, a path between $L_n$ and point $p_i$ may be determined, the distance d of the path may be determined, an average speed s along the path may be determined, and the travel time $\tau$ may be calculated based on the formula $\tau = d/s$. The travel parameters discussed above may be used in determining values for these variables, as well as other known data (e.g., map data, traffic data, etc.). For example, when the mode of travel is via automobile, the appropriate path between the location $L_n$ and the point $p_i$ may be restricted to follow established roads, and hence might not be a straight line between the location $L_n$ and the point $p_i$. Additional rules may further delimit the path, such as rules to avoid (or favor) toll roads, rules to avoid unpaved roads, rules to avoid (or favor) highways, etc. The average speed s may be determined, for example, from speed limit data of the roads along the path, in a manner similar to that discussed above. Additional considerations such as the number of stop lights along the path and traffic information along the path (based on a time of day for the travel) may be considered as well in determining the average speed s. In determining the travel time $\tau_{n,i}$ between $L_n$ and point $p_i$, there will almost always be multiple possible paths between $L_n$ and point $p_i$, and therefore multiple travel times may be calculated for a given point $p_i$ (for different paths), and the shortest one of these calculated travel times may be considered the travel time $\tau_{n,i}$. Rules may be used to exclude some of the paths prior to calculating travel times to reduce processing requirements. As another example, the travel times $\tau_{n,i}$ could be determined by collecting actual travel time data for numerous path segments (e.g., for each block, every 1000 ft., etc.) and using this data to determine an estimated travel time for each of the path segments. These path-segment travel times could be used to determine the travel time for a path by summing the path-segment travel times of the segments composing the path. The data used to determine such path segment travel times may be as nuanced as is desired—for example, considerations such as the time of day, the day of the week, the direction of travel, the direction in which the driver exited the path segment (e.g., did they continue straight at the end of the path segment or did they turn), and many others could be used to increase the specificity of the calculated travel times.

The travel times $\tau_{n,i}$ do not necessarily have to be calculated incident to calculating the travel time polygons. For example, travel times may be determined in advance between every point in the grid of points and stored for later use. Thus, determining a travel time $\tau_{n,i}$ between $L_n$ and point $p_i$ may consist in simply looking up a stored value. Moreover, the actual calculation of the travel times does not necessarily have to be performed by the property search application; for example, the property searching application may determine the travel times by communicating with a third-party application that calculates travel times.

As noted above, the boundary of the polygon $P_n$ may consist of a number of boundary points $\beta$, as well as lines connecting neighboring boundary points $\beta$ to each other. The boundary points $\beta$ correspond to the vertices of the polygon $P_n$. The boundary points $\beta$ do not necessarily have to be spaced at any particular level of granularity—in particular, when the method of determining travel times for a finite set of points $p_i$ is used, the level of granularity of the boundary points $\beta$ does not have to be the same as the level of granularity of the grid of points $p_i$. For example, supposing that the points $p_i$ are spaced approximately every quarter mile, neighboring boundary points could be spaced, for example, every mile.

The more fine the level of granularity of the boundary points $\beta$, the more accurately the boundary of the polygon $P_n$ will correspond to locations that are travel $t_n$ from $L_n$. In one exemplary embodiment in which the method of determining travel times for a finite set of points $p_i$ is used, the boundary of $P_n$ is determined such that for each point $p_i$, if $\tau_{n,i} \leq t_n$ then $p_i$ is included in $P_n$ and if $\tau_{n,i} > t_n$ then $p_i$ is excluded from $P_n$. In other words, $\forall i | p_i \in P_n \Leftrightarrow \tau_{n,i} \leq t_n$. In this exemplary embodiment, the boundary points $\beta$ are spaced approximately the same as the points $p_i$—that is, neighboring boundary points $\beta$ are also neighboring points $p_i$. The boundary points $\beta$ in such an embodiment may be determined simply by "brute force" (i.e., calculating $\tau_{n,i}$ for every point $p_i$ in the grid and identifying boundary points $\beta$ based on the travel times $\tau_{n,i}$). However, $\tau_{n,i}$ does not necessarily need to be calculated for every point $p_i$ to determine the contours of $P_n$, and to save computational resources it may be desirable to employ a method of determining $P_n$ that reduces the number of points $p_i$ for which $\tau_{n,i}$ is calculated. For example, $\tau_{n,i}$ may be calculated successively for points $p_i$ that are successively further from $L_n$ in a direction approximately radially outward from $L_n$ until a first point $p_i$ is determined to be boundary point $\beta$ of $P_n$ (call it $\beta^1$). Once the first boundary point $\beta^1$ is found, adjacent boundary points $\beta$ may be found by determining $\tau_{n,i}$ for points $p_i$ neighboring the identified boundary point $\beta^1$. Two of the points $p_i$ neighboring $\beta^1$ will be identified as a boundary point $\beta$ (call them $\beta^2$ and $\beta^3$), and the neighboring points $p_i$ of $\beta^2$ and $\beta^3$ may then be examined to find additional boundary points $\beta$ that are adjacent to $\beta^2$ and $\beta^3$. This process is repeated for each successively identified boundary point $\beta$ until the polygon is closed (i.e., the process returns to the first boundary point $\beta^1$). The identification of a point $p_i$ as a boundary point may be done using any known edge detection technique—for example, if a given point whose travel time $\tau_{n,i}$ is less than or equal to $t_n$ has an immediately adjacent neighbor whose travel time $\tau_{n,i}$ is greater than $t_n$, then the given point may be identified as a border point $\beta$.

In other exemplary embodiments, the boundary points $\beta$ are not necessarily spaced at the same level of granularity as the points $p_i$. For example, $\tau_{n,i}$ may be calculated successively for points $p_i$ that are successively further from $L_n$ in a first direction approximately radially outward from $L_n$ until a first point $p_i$ is determined to be boundary point $\beta$ of $P_n$ (call it $\beta^1$). Then, the same process may be repeated but this time in a second direction radially outward from $L_n$ until a second boundary point $\beta^2$ is determined. This is repeated for a number of directions until a sufficient number of boundary points $\beta$ have been found.

The forgoing are merely exemplary processes of determining the boundary of $P_n$, and it is certainly possible to employ other methods to efficiently determine $P_n$ or to further modify the above-described methods.

Of course, it will be understood that exact precision is not required or possible in determining the boundary of $P_n$. In other words, although the points on the boundary of $P_n$ are all approximately $t_n$ away from $L_n$, at least some of the points on the boundary of $P_n$ are likely to be slightly more or less than exactly $t_n$ away from $L_n$. At least one source of such error results from the fact that only a finite set of discrete points is used in determining $P_n$. In particular, the grid of points $p_i$ that are used to calculate travel times in constructing $P_n$ cannot be infinitely dense, or else the computing system 100 would not be able to calculate the travel times, and thus there must be some finite level of granularity in the grid of points $p_i$. This granularity means that each identified border point $\beta$ may be $\pm \varepsilon$ off from being exactly $t_n$ from $L_n$, where $\varepsilon$ is related to the distance between grid points $p_i$ (e.g., an average distance between points). Increasing the granularity of the grid points $p_i$ (i.e., decreasing $\varepsilon$) will decrease this error, but will result in greater computational requirements. Conversely decreasing the granularity (i.e., increasing $\varepsilon$) will increase error but decrease computational requirements. The appropriate level of granularity may be selected based on the particular requirements of the situation, balancing accuracy against computational requirements. Moreover, the granularity may vary across the region; for example, in areas having a higher density of roads, the granularity may be increased.

Another source of error is that arising from interpolating between boundary points $\beta$—the lines connecting the boundary points $\beta$ to each other may not track perfectly the hypothetical exact boundary. Other sources of error may exist as well, and such error does not disqualify a given polygon from being considered a "travel time polygon" $P_n$ or a travel-time contour.

Furthermore, although a travel time "polygon" has been described above, it will be understood that this is merely one example of a travel time contour. Other travel time contours could be used such as, for example, a contour that has boundary points β as vertices (like the polygons discussed above), but with non-straight connections (e.g., arcs) between the boundary points. As another example, a contour may be constructed by determining a set of boundary points β and then performing a statistical regression on these boundary points to determine a smooth curve that approximately fits the boundary points β.

A constructed area may be considered to be a "travel time contour" if its boundary is determined based on calculated travel times from $L_n$, with the travel time $t_n$ being used as a target value for the boundary points β that are used to determine the boundary of the area, regardless of the level of granularity used in the calculation, regardless of interpolation between boundary points, and regardless of other sources of error.

Figure 4:
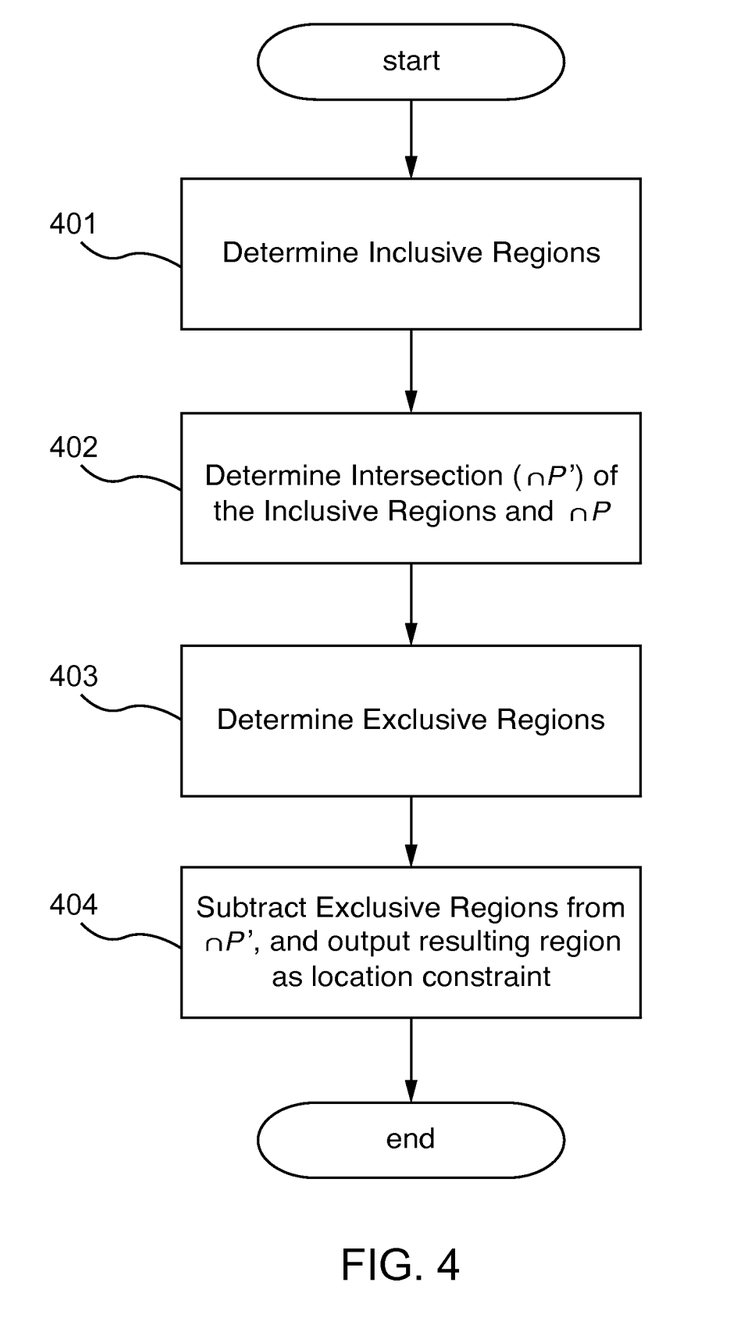
FIG. 4 is a process flow diagram illustrating a process for determining a location constraint.
Figure 5:
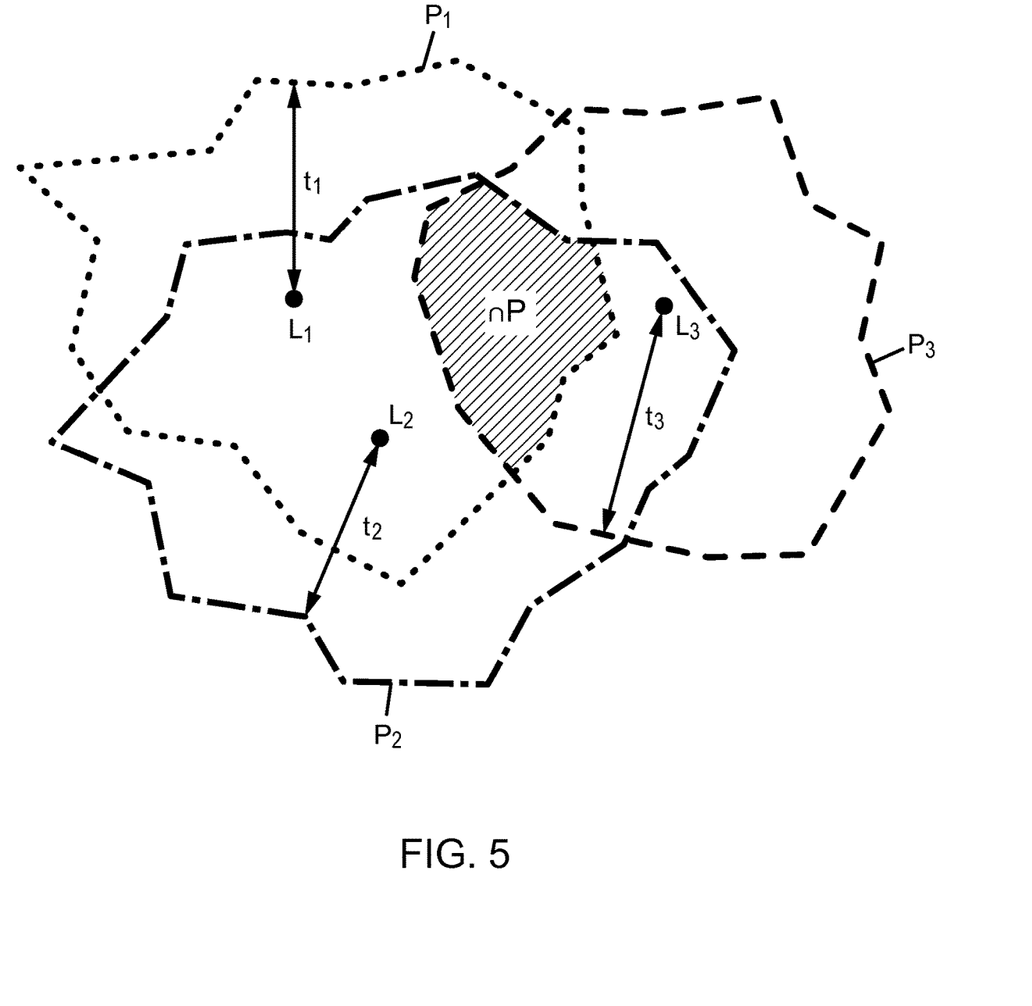
FIG. 5 is a conceptual diagram illustrating travel time polygons and their intersection.

Exemplary locations $L_n$ and their corresponding travel time polygons $P_n$ are illustrated in FIG. 4. In particular, location $L_1$ has a corresponding polygon $P_1$, whose boundary corresponds to locations that are approximately travel time $t_1$ away from location $L_1$. Similarly, locations $L_2$ and $L_3$ have corresponding polygons $P_3$ and $P_3$, respectively, based on maximum travel times $t_2$ and $t_3$. Locations $L_1$, $L_2$, and $L_3$ may, for example, correspond to two locations of employment for a couple, and $L_3$ may correspond to a daycare center for their child, and the maximum times $t_1$, $t_2$, and $t_3$ may be set to 20 minutes, 20 minutes, and 30 minutes, respectively.

In block 220, it is determined whether there are additional locations $L_n$ that still need a travel time polygon $P_n$ calculated for them. If yes, then the process passes to block 230 in which n is incremented (new value of n is set to the old value of n plus one), and then the loop begins again. If all of the locations $L_n$ have been considered, then the process passes to block 235. The determination of whether additional locations $L_n$ still need travel time polygons $P_n$ will be based on whether each location in a set of user selected locations has been determined as a location $L_n$ (block 210) and had a polygon $P_n$ determined for it. The set of user selected locations may be fixed by various methods. For example, after a user has selected some locations, the user may select an option that indicates that they are finished entering locations, thereby fixing the set of locations to be considered by the process and allowing the process to start. As another example, after a user has selected one or more locations a timer may start and after a time-out period passes without the selection of another location, it may be determined that the locations selected up to that point are fixed as the set of location to be considered by the process, and the process may start.

In block 235, the intersection (∩P) of the travel polygons $\{P_1, P_2, \ldots, P_n\}$ is determined. FIG. 4 illustrates conceptually the intersection ∩P of the travel time polygons $P_1$, $P_2$, and $P_3$, which is the region with diagonal hashing.

In block 240, a sub-process is executed in which a location constraint LOC is determined based on the intersection ∩P. The location constraint LOC corresponds to a geographic region. In one embodiment, the location constraint LOC may simply be the same as the intersection ∩P, in which case blocks 235 and 240 may be combined into one step. However, as will be discussed further below, with reference to FIGS. 4 through 7, LOC may correspond to a region that is not identical to the intersection ∩P—in particular, LOC may omit portions of ∩P based on considerations related to regions of interest selected by the user. However, in general the region corresponding to LOC is either a subset of ∩P or is coextensive with ∩P.

In block 245, a database of property data may be searched based at least in part on the location constraint LOC. For example, the search may return only properties that are located within the geographical region corresponding to LOC. The search may be additionally limited by other search constraints (e.g., price, square footage, age, etc.). Each of the properties returned by the search will be located such that the respective travel times between the property and the user-selected locations of interest $L_n$ is within the maximum travel times designated by the user. In other words, each property included in the search results list will be suitable to the user from a travel-times perspective (with respect to all of the relevant travel locations/times specified by the user), and as a result of this the user will not have to go through the process of separately checking each property in the list to determine whether it is suitable from a travel times perspective.

If the ∩P returns a null-set (i.e., there is no region that satisfies all of the user-selected travel time requirements), then the user may be notified of this and prompted to adjust their travel time requirements, whereupon the process may be run again using the updated parameters. The application may display a map image illustrating the polygons $P_n$ to facilitate the user's adjustments of the travel time parameters. Moreover, when a given polygon $P_k$ can be identified as being the sole reason why ∩P returns a null-set, the application may prompt the user to modify the maximum travel time $t_k$ for the location $L_k$. The given polygon $P_k$ can be identified as being the sole reason why ∩P returns a null-set if removing $P_k$ from the set $\{P_n\}$ solve the problem (i.e., $P_k$ can be identified as the culprit if $\cap\{P_n|_{\forall n \neq k}\}$ is not a null-set).

Figure 3:
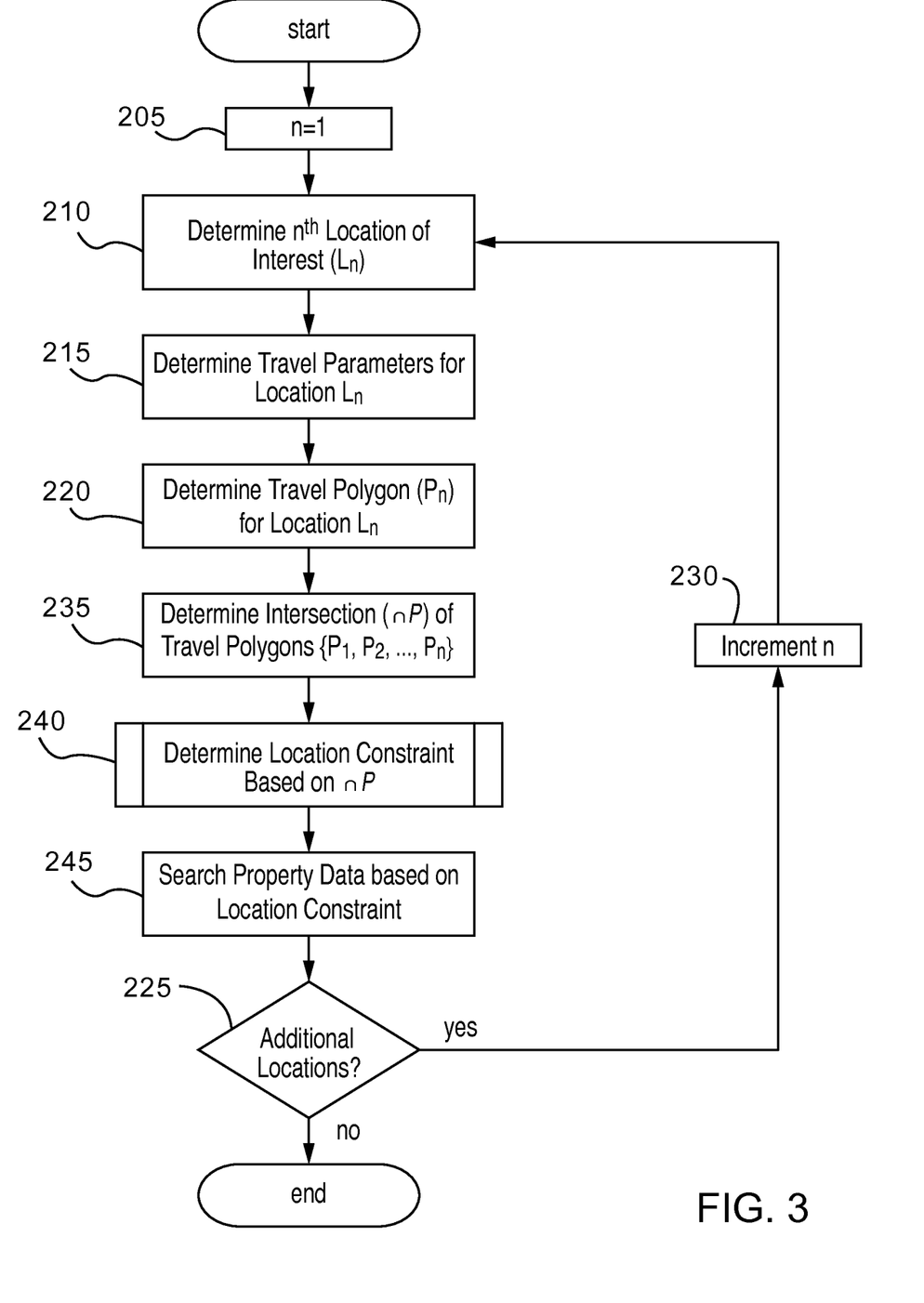
FIG. 3 is a process flow diagram illustrating a process for searching a database based on a location constraint.

In the process illustrated in FIG. 2, a loop is executed between blocks 210 and 230. However, the process could be modified such that the decision block that controls the loop is located at different points in the process. For example, in FIG. 3 the decision block 225 is located after the block 250 instead of after the block 220. All other portions of the process shown in FIG. 3 are similar to those discussed with regard to FIG. 2, and thus description thereof is omitted. In FIG. 2, the polygons $P_n$ are first determined for each of the locations $L_n$ via the loop, and after the loop terminates the intersection ∩P is calculated once, the search constraint is determined once, and the property data is searched once. In contrast, in FIG. 3 the loop includes the calculation of the intersection ∩P, the determination of the location constraint, and the searching of the property data, and thus these steps are performed each successive pass through the loop.

Configurations other than those illustrated in FIGS. 2 and 3 are also possible, and all are within the scope of this disclosure. Specifically, the decision block 225 could be moved to other locations in the process. For example, the location constraint could be updated (block 240) with each pass through the loop, but the searching of the property data (block 245) could be omitted from the loop (for example, the search only proceeds after a user input triggering the search is received). Moreover, the loop could be omitted altogether, and the polygons $P_n$ could be determined in parallel. As long as at least one polygon $P_n$ has been determined, then one or more of blocks 235 through 245 can be executed at any time thereafter, and they may be executed or updated as many times as are required.

Moreover, when a user adds a new location of interest $L_n$ or changes a travel parameter after the process has already been completed, the results may be dynamically updated based on the changed information. Information that was previously determined or calculated and that is unaffected by the change may be used by the application without having to re-determine/recalculate the information. For example, if the process of FIG. 2 has been completed for locations $L_1$ through $L_N$ and a user subsequently adds a new location $L_{N+1}$, then blocks 210 through 220 could be performed for only new location $L_{N+1}$, and then blocks 235 through 245 could be performed using $\{P_1, P_2, \ldots P_{N+1}\}$. Performance of blocks 210 through 220 for locations $L_1$ through $L_N$ could be omitted, since travel polygons $\{P_1, P_2, \ldots P_N\}$ are already known to the application from the first time the process was executed.

FIG. 4 illustrates an example of the sub-process of block 240 from FIGS. 2 and 3. This sub-process determines the location constraint LOC based on ∩P.

In block 401, the property search application determines a set of inclusive regions. The regions represent geographical areas that the user desires to constrain the property search to be within (in addition to the constraint of travel time). For example, a parent may wish a property to be in a certain school district. As another example, an operator of a home-based business may desire the property to be located in a region whose zoning restrictions allow for such home-based businesses. The boundaries of such regions may be determined from readily available data, such as from the local governments near the location.

These inclusive regions may be selected by a user. For example, the property search application may be configured to present options to the user of predefined inclusive regions that the user can select from. For example, categories such as a "school district" or a "zoning district" may be provided, and if any of these options are selected, a list of candidate regions for the selected category may be provided. The user may select more than one category of inclusive region, and/or more than one specific candidate region from within a selected category.

The inclusive regions may also be selected directly by a user. For example, the user may draw the boundaries of the inclusive region in a displayed map image.

The inclusive regions may also be model-selected, based on criteria entered by a user (or default criteria). For example, a model may be used to estimate regions of interest based on their overall proximity to amenities. In such a case, a user may specify a minimum value of the metric used by the model for gauging proximity to amenities (e.g., an "amenity score"), and an inclusive region can be determined in which the metric meets or exceeds the specified minimum value. As another example, a user may enter a desired average square footage for properties in the region of interest, and a model may determine regions that satisfy this average square footage requirement.

If no inclusive regions are selected (and no default inclusive regions are used by the application), then blocks 401 and 402 may be omitted.

Figure 6:
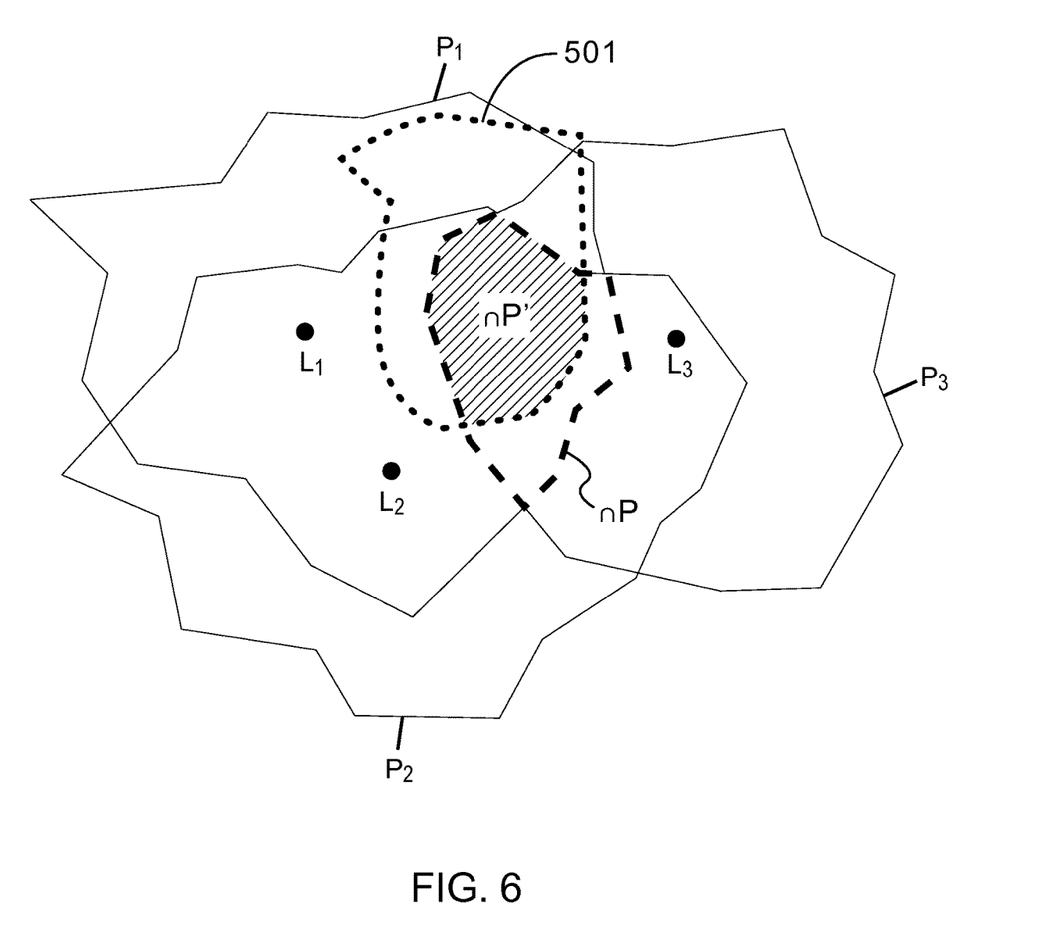
FIG. 6 is a conceptual diagram illustrating an intersection of an inclusive region with the travel time polygons of FIG. 5.
Figure 7:
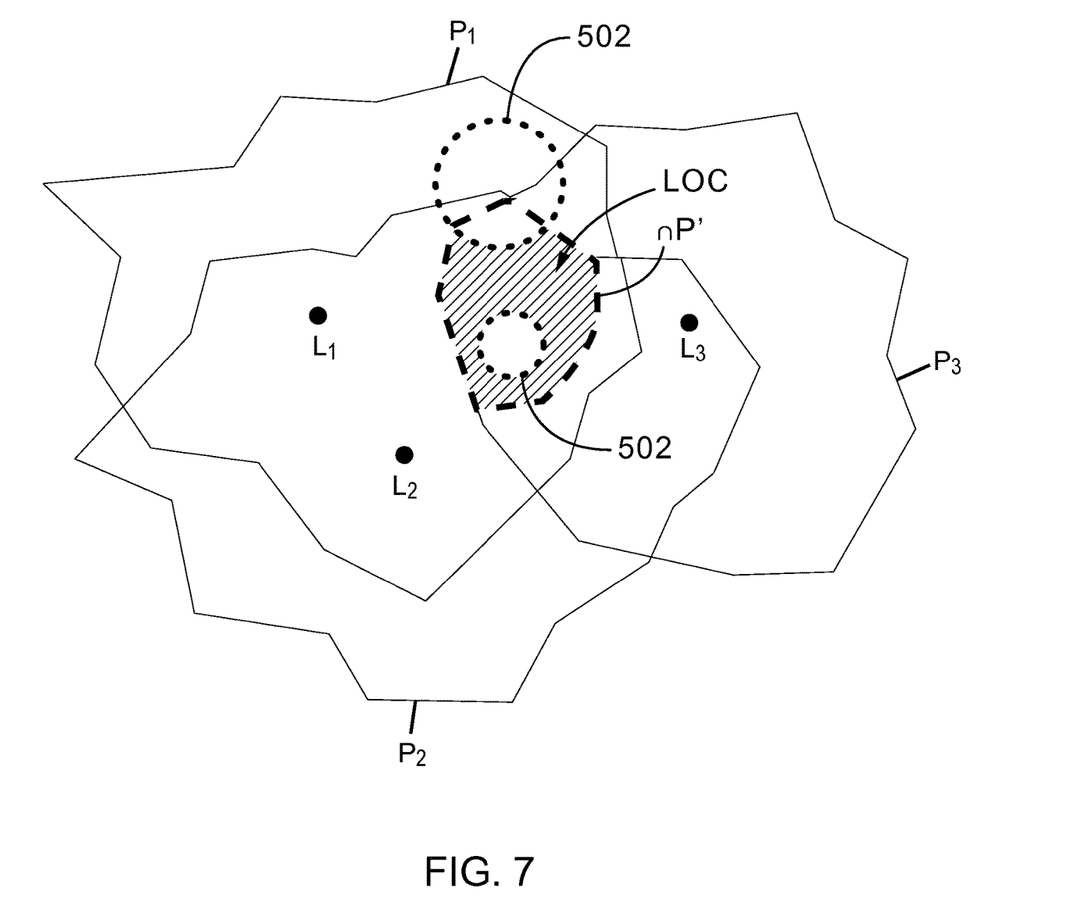
FIG. 7 is a conceptual diagram illustrating an a region resulting from subtracting exclusive regions from the intersection of FIG. 6.

In block 402, the intersection ∩P' between the selected inclusive regions and ∩P is determined. For example, in FIG. 6, one inclusive region 501 has been selected. The intersection ∩P' between the inclusive region 501 and ∩P is illustrated with diagonal hashing. As can be seen in FIG. 6, a portion of ∩P is omitted from ∩P' because that portion of ∩P is not included in the inclusive region 501. Moreover, some portions of the inclusive region 501 have also been omitted from ∩P' because those portions of region 501 are not within ∩P.

It is possible for the intersection ∩P' to return a null-set. For example, if two non-overlapping inclusive regions are selected, then the result of their intersection with ∩P is a null-set, since the two inclusive regions do not intersect. As another example, if one of the inclusive regions does not overlap with ∩P, then the result of the intersection is again a null set. In the case of returning a null set, the user may be notified of the fact and prompted to change their selections.

In selecting inclusive regions it is also possible for the user to identify two or more regions as alternates (i.e., the property must be in at least one of the regions, but not necessarily all). In such a case, the alternate regions are not treated as individual "inclusive regions", and hence are not individually intersected with ∩P to obtain ∩P'. Instead, such alternate regions are combined together to create a combined inclusive region, which is what is ultimately intersected with ∩P to obtain ∩P'. In particular, the inclusive region is the sum of the alternate regions. Thus, for example, if a parent finds three different school districts to all be acceptable, the parent might select all three school districts as alternates; in such a case, the "inclusive region" that is ultimately intersected with ∩P to obtain ∩P' is the sum of the three school districts. This is in contrast to treating each selected school district as if it were its own inclusive region and intersecting each school district individually with ∩P, which would return a null-set (since none of the school districts overlap). It should be noted that such a combined inclusive region does not necessarily mean a single contiguous shape—to continue the school district example, the school districts selected as alternates do not have to be touching each other. Instead, the combined "inclusive region" may be the logical combination of constituent regions which may or may not be physically contiguous with each other, such that a property would be considered to be located within this "inclusive region" if it is located within any of the constituent regions.

In the event that more than one regions of the same category are selected as inclusive regions (e.g., three school districts are selected), the property search application may automatically treat these selections as selections of alternates, and may combine the selected regions into a combined inclusive region.

In block 403 the property search application determines a set of exclusive regions. The exclusive regions represent geographical areas that the user desires to constrain the property search to exclude (regardless of their travel time). These exclusive regions could be regions that are too close to some undesirable feature, such as waste-disposal facilities, prisons, airports, industrial areas, etc. However, these may also simply be neighborhoods or regions that the user knows they do not want to live in for one reason or another regardless of any particular unpleasant item.

The exclusive regions may be determined similarly to the inclusive regions. For example, options of predefined categories may be provided to the user for selection, and upon selection of a category, predefined regions may be presented for selection. Predefined regions may include ones such as an zoning districts (e.g., an industrial district), a political division (e.g., city, county, state), and other pre-defined divisions (e.g., named neighborhoods, census tracts).

The user may also directly select an exclusive region. For example, a user may draw a boundary of the exclusive region on a displayed map image.

Alternatively, a region may be constructed from a model based on user defined criteria. For example, a model may gauge the amount of crime by location, and in such a case, a user may specify a minimum value of the metric used by the model for gauging crime (e.g., a "crime score"), and an exclusive region can be determined in which the metric fails to meet the specified minimum value. As another example, a user may select a category of unpleasant feature (e.g., airports, waste disposal facilities, prisons, etc.) and specify a minim distance that the user would like their property to be from such features. In such a case, the model could generate exclusive regions by identifying each instance of the selected category in the vicinity of the selected locations (e.g., each airport), and, for each such instance, creating an exclusive region that encircles the instance with a radius equal to the specified minimum distance.

If no exclusive regions are selected (and no default exclusive regions are used by the application), then blocks 403 and 404 may be omitted.

In block 404, each of the exclusive regions is subtracted from ∩P', and the resulting region is output as LOC. For example, in FIG. 7 two exclusive regions 502 have been selected. As can be seen in the figure the location constraint LOC constitutes the region (shown with diagonal hashing) resulting from subtracting the exclusive regions 502 from ∩P'. It is possible that the region corresponding to the location constraint LOC is not a single contiguous shape. In particular, although the intersection ∩P must be a single contiguous region, as a result of the intersections with and subtractions from ∩P that are performed in blocks 402 and 404, the resulting location constraint LOC region may be comprised of two physically separated regions. These physically separated regions are still treated logically as being the same region (the region LOC), such that a property is considered as being located in the region LOC if it is located in any one of the constituent regions thereof (in the same way that the United States may be treated as a single logical region even though some parts thereof are not physically contiguous, such as Alaska and the "Lower 48" states).

Although the discussion above describes various operations as being performed by a singular entity (e.g., "a computing system 100", "a property search application"), it will be understood that this is merely for convenience of discussion and does not exclude the possibility of performance of these functions in a distributed manner.

For example, operations described herein as being performed by "a computing system" may be performed in a distributed manner across multiple physically distinct devices, and operations described as being associated with "a property search application" may be distributed across multiple distinct applications. For example, a first device may execute one portion of the program code and perform a subset of the operations described herein, while a second device (perhaps in communication with the first device) may execute another portion of the program code and perform another subset of the operations described herein. For example, geographic (map) data may be stored on one server, property data on another server, a searching algorithm portion of a property search application on still another server, and a user interface portion of the property search application on a user's computing device. There are numerous possible ways to distribute the described functions over various devices and instances of computer programming, but since such distribution of operations across multiple devices and/or multiple applications is well known in the art, a detailed description of the various permutations is omitted.

Accordingly, it will be understood that when "a computing system" is referred to in the appended claim, this may include any number of physically distinct devices that work in concert to perform the recited operations, unless specifically indicated otherwise. Further, any reference to a component in the singular (e.g., "a processor") should not be read as excluding the possibility of multiple components (e.g., multiple processors), unless specifically indicated otherwise. Thus, for example, when "a non-transitory computer readable medium storing program code thereon" is referred to herein, it will be understood that this may include multiple physically distinct media that each may store some portions of the program code but not necessarily other portions thereof, unless specifically indicated otherwise. In addition, when "program code" is referred to in the appended claims, it will be understood that multiple discrete instances of program code (or applications) may be employed.

It will be understood that a computing system "performs" an operation when the computing system issues instructions (commands) that are of the type that would cause a particular device or component to perform the operation should it receive the commands. This is true even if the device or component that ultimately carries out the operation is not part of the computing system. Thus, for example, a server may be said to "display" a webpage even if there is no display device associated with the server, as long as the server issues instructions that are of the type that would cause the web-page to be displayed (for example, the server provides instructions for the web-page to a user's computer).

Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A non-transitory computer readable medium that stores program code that is configured to, when executed by a computing system, cause the computing system to perform a set of operations comprising:
    receiving information indicative of a first location of interest, a second location of interest, and an inclusive geographic region that is distinct from and has a different size than the first location of interest and the second location of interest, the information defining the inclusive geographic region by a first set of geographical boundaries;
    receiving information indicative of travel parameters for the first and second locations of interest, the travel parameters including a first maximum travel time to the first location of interest, a second maximum travel time to the second location of interest, a first time of day at which travel will be undertaken, and a second time of day at which travel will be undertaken;
    determining a first travel time contour based on the first location of interest, the first maximum travel time, and the first time of day, the first travel time contour defined by a second set of geographical boundaries that is distinct from and overlapping the first set of geographical boundaries;
    determining a second travel time contour based on the second location of interest, the second maximum travel time, and the second time of day, the second travel time contour defined by a third set of geographical boundaries that is distinct from and overlapping the first set of geographical boundaries and the second set of geographical boundaries;
    determining an intersection of the first set of geographical boundaries, the second set of geographical boundaries, and the third set of geographical boundaries;
    determining a location constraint based at least in part on the intersection of the first set of geographical boundaries, the second set of geographical boundaries, and the third set of geographical boundaries;
    retrieving property data from a database based on the location constraint;

generating a graphical user interface including a map image and a plurality of user-input sections;
responsive to determining the location constraint, updating the graphical user interface to further include the location constraint overlaid on the map image;
responsive to retrieving the property data, updating the graphical user interface to identify properties from the property data in the location constraint that is overlaid on the map image; and
controlling a display to display the graphical user interface.

2. The non-transitory computer readable medium of claim 1, wherein the set of operations further includes
receiving additional information indicative of an exclusive geographic region defined by a fourth set of geographical boundaries that overlaps the intersection of the first set of geographical boundaries, the second set of geographical boundaries, and the third set of geographical boundaries, the exclusive geographic region having a different size than the first location of interest, the second location of interest, and the inclusive geographic region,
wherein determining the location constraint further includes subtracting the exclusive geographic region from the intersection of the first set of geographical boundaries, the second set of geographical boundaries, and the third set of geographical boundaries.

3. The non-transitory computer readable medium of claim 1,
wherein the property data is only properties that are located within a geographic region corresponding to the location constraint.

4. The non-transitory computer readable medium of claim 1,
wherein the travel parameters further include a mode of travel,
wherein determining the first travel time contour is based on the first location of interest, the first maximum travel time, and the mode of travel, and
wherein determining the second travel time contour is based on the second location of interest, the first maximum travel time, and the mode of travel.

5. A method, comprising:
receiving, with an electronic processor, information indicative of a first location of interest, a second location of interest, and an inclusive geographic region that is distinct from and has a different size than the first location of interest and the second location of interest, the information defining the inclusive geographic region by a first set of geographical boundaries;
receiving, with the electronic processor, travel parameters for the first and second locations of interest, the travel parameters including a first maximum travel time to the first location of interest, a second maximum travel time to the second location of interest, a first time of day at which travel will be undertaken, and a second time of day at which travel will be undertaken;
determining, with the electronic processor, a first travel time contour based on the first location of interest, the first maximum travel time, and the first time of day, the first travel time contour defined by a second set of geographical boundaries that is distinct from and overlapping the first set of geographical boundaries;
determining, with the electronic processor, a second travel time contour based on the second location of interest, the second maximum travel time, and the second time of day, the second travel time contour defined by a third set of geographical boundaries that is distinct from and overlapping the first set of geographical boundaries and the second set of geographical boundaries;
determining, with the electronic processor, an intersection of the first set of geographical boundaries, the second set of geographical boundaries, and the third set of geographical boundaries;
determining, with the electronic processor, a location constraint based at least in part on the intersection of the first set of geographical boundaries, the second set of geographical boundaries, and the third set of geographical boundaries;
retrieving, with the electronic processor, property data from a database based on the location constraint;
generating, with the electronic processor, a graphical user interface including a map image and a plurality of user-input sections;
responsive to determining the location constraint, updating, with the electronic processor, the graphical user interface to further include the location constraint overlaid on the map image;
responsive to retrieving the property data, updating, with the electronic processor, the graphical user interface to identify properties from the property data in the location constraint that is overlaid on the map image; and
controlling a display to display the graphical user interface.

6. The method of claim 5, further comprising:
receiving additional information indicative of an exclusive geographic region defined by a fourth set of geographical boundaries that overlaps the intersection of the first set of geographical boundaries, the second set of geographical boundaries, and the third set of geographical boundaries, the exclusive geographic region having a different size than the first location of interest, the second location of interest, and the inclusive geographic region,
wherein determining the location constraint further includes subtracting an overlapping portion of the fourth set of geographical boundaries from the intersection of the first set of geographical boundaries, the second set of geographical boundaries, and the third set of geographical boundaries.

7. The method of claim 5,
wherein the property data is only properties that are located within a geographic region corresponding to the location constraint.

8. The method of claim 5,
wherein the travel parameters further include a mode of travel,
wherein determining the first travel time contour is based on the first location of interest, the first maximum travel time, and the mode of travel, and
wherein determining the second travel time contour is based on the second location of interest, the first maximum travel time, and the mode of travel.

9. A computing system, comprising:
a processor;
a memory having program code stored thereon, the program code being configured to, when executed by the processor, cause the computing system to perform a set of operations comprising:
receiving information indicative of a first location of interest, a second location of interest, and an inclusive geographic region that is distinct from and has a different size than the first location of interest and the second location of interest, the information defining the inclusive geographic region by a first set of geographical boundaries;

receiving information indicative of travel parameters for the first and second locations of interest, the travel parameters including a first maximum travel time to the first location of interest, a second maximum travel time to the second location of interest, a first time of day at which travel will be undertaken, and a second time of day at which travel will be undertaken;

determining a first travel time contour based on the first location of interest, the first maximum travel time, and the first time of day, the first travel time contour defined by a second set of geographical boundaries that is distinct from and overlapping the first set of geographical boundaries;

determining a second travel time contour based on the second location of interest, the second maximum travel time, and the second time of day, the second travel time contour defined by a third set of geographical boundaries that is distinct from and overlapping the first set of geographical boundaries and the second set of geographical boundaries;

determining an intersection of the first set of geographical boundaries, the second set of geographical boundaries, and the third set of geographical boundaries;

determining a location constraint based at least in part on the intersection of the first set of geographical boundaries, the second set of geographical boundaries, and the third set of geographical boundaries;

retrieving property data from a database based on the location constraint;

generating a graphical user interface including a map image and a plurality of user-input sections;

responsive to determining the location constraint, updating the graphical user interface to further include the location constraint overlaid on the map image;

responsive to retrieving the property data, updating the graphical user interface to identify properties from the property data in the location constraint that is overlaid on the map image; and controlling a display to display the graphical user interface.

10. The computing system of claim 9, wherein the set of operations further includes receiving additional information indication of an exclusive geographic region defined by a fourth set of geographical boundaries that overlaps the intersection of the first set of geographical boundaries, the second set of geographical boundaries, and the third set of geographical boundaries, the exclusive geographic region having a different size than the first location of interest, the second location of interest, and the inclusive geographic region, wherein determining the location constraint further includes subtracting an overlapping portion of the fourth set of geographical boundaries from the intersection of the first set of geographical boundaries, the second set of geographical boundaries, and the third set of geographical boundaries.

11. The computing system of claim 9, wherein the property data is only properties that are located within a geographic region corresponding to the location constraint.

12. A non-transitory computer readable medium that stores program code that is configured to, when executed by a computing system, cause the computing system to perform a set of operations comprising:

receiving information indicative of a location of interest and an inclusive geographic region that is distinct from and has a different geographic size than the location of interest, the information defining the inclusive geographic region by a first set of geographical boundaries;

receiving information indicative of travel parameters for the location of interest, the travel parameters including a maximum travel time and a time of day at which travel will be undertaken;

determining a travel time contour based on the location of interest and the maximum travel time, the travel time contour defined by a second set of geographical boundaries that is distinct from and overlapping the first set of geographical boundaries;

determining an intersection of the first set of geographical boundaries and the second set of geographical boundaries; and determining a location constraint based on the intersection of the first set of geographical boundaries and the second set of geographical boundaries;

retrieving property data from a database based on the location constraint;

generating a graphical user interface including a map image and a plurality of user-input sections;

responsive to determining the location constraint, updating the graphical user interface to further include the location constraint overlaid on the map image;

responsive to retrieving the property data, updating the graphical user interface to identify properties from the property data in the location constraint that is overlaid on the map image; and controlling a display to display the graphical user interface.

13. The non-transitory computer readable medium of claim 12, wherein the set of operations further includes receiving additional information of an exclusive geographic region defined by a third set of geographical boundaries that overlaps the intersection of the first set of geographical boundaries and the second set of geographical boundaries, the exclusive geographic region having a different size than the location of interest and the inclusive geographic region, wherein determining the location constraint further includes subtracting an overlapping portion of the third set of geographical boundaries from the intersection of the first set of geographical boundaries and the second set of geographical boundaries.

14. The non-transitory computer readable medium of claim 12, wherein the property data is only properties that are located within a geographic region corresponding to the location constraint.

15. The non-transitory computer readable medium of claim 1, wherein the first set of geographical boundaries is a set of school district geographical boundaries.

16. The method of claim 6, wherein the first set of geographical boundaries is a set of school district geographical boundaries.

17. The computing system of claim 10, wherein the first set of geographical boundaries is a set of school district geographical boundaries.

18. The non-transitory computer readable medium of claim 1, wherein a first user-input section of the plurality of user-input sections receives information from a user regarding the first location of interest on the map image, wherein a second user-input section of the plurality of user-input sections receives information from the user regarding the second location of interest on the map image, wherein a third user-input section of the plurality of user-input sections receives information from the user regarding the first maximum travel time to the first location of interest, wherein a fourth user-input section of the plurality of user-input sections receives information from the user regarding the second maximum travel time to the second location of interest, wherein a fifth user-input section of the plurality of user-input sections receives information from the user regarding the first time of day, wherein a sixth user-input section of the plurality of user-input sections receives information from the user regarding the second time of day, and wherein a seventh user-input section of the plurality of user-input sections receives information from the user regarding the inclusive geographic region.

* * * * *